H. SYNCK.
FERTILIZER DISTRIBUTER.
APPLICATION FILED MAY 24, 1911.
1,008,089.
Patented Nov. 7, 1911.
3 SHEETS—SHEET 2.
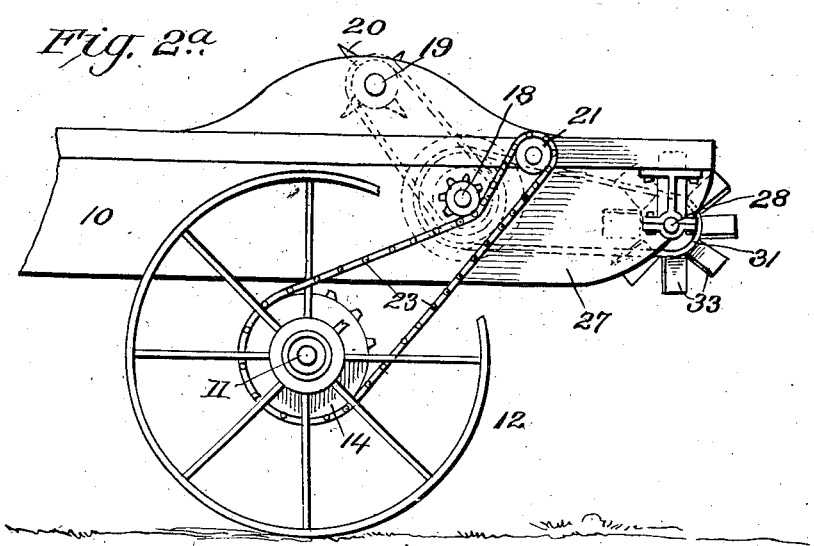
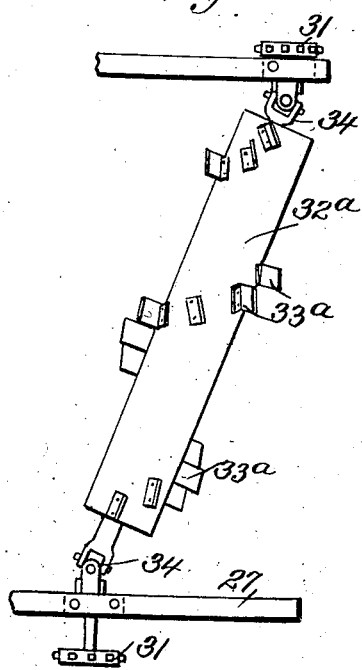
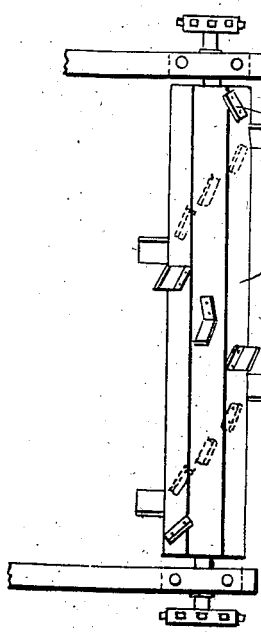
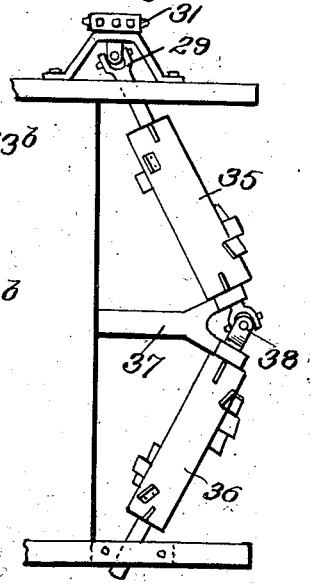
Inventor
Henry Synck
Witnesses

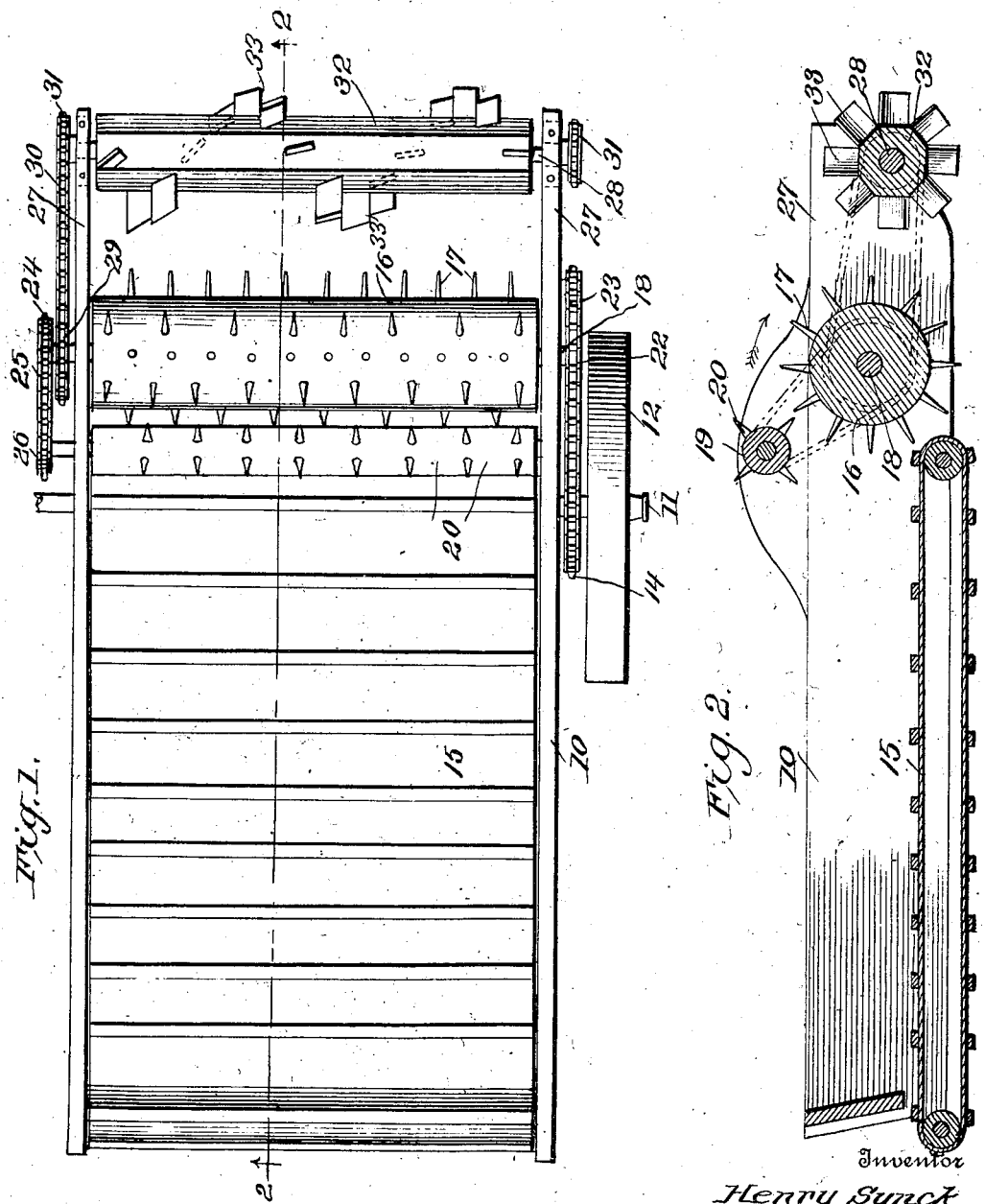

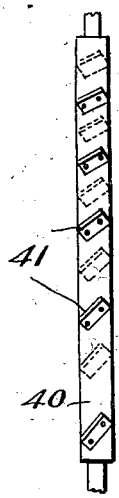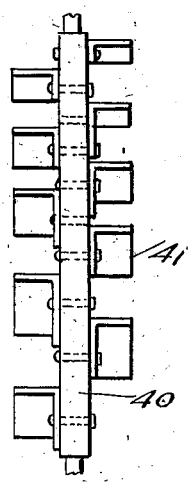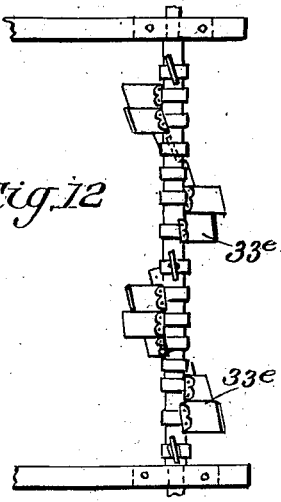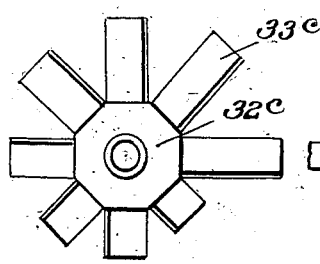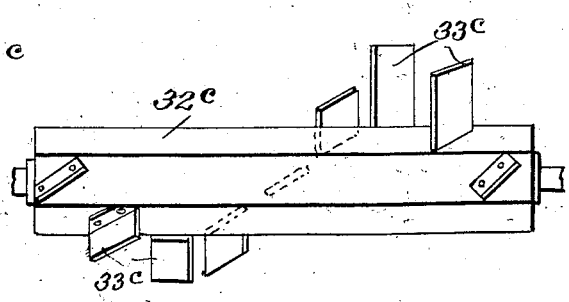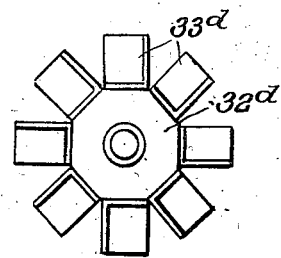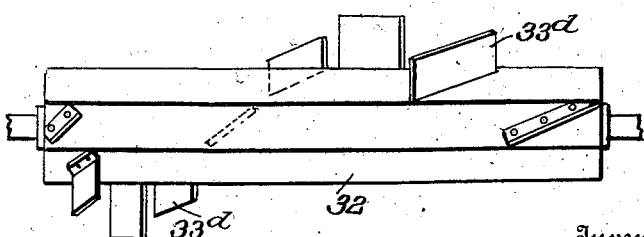

UNITED STATES PATENT OFFICE.

HENRY SYNCK, OF MARIA STEIN, OHIO, ASSIGNOR TO NEW IDEA SPREADER COMPANY, OF MARIA STEIN, OHIO.

FERTILIZER-DISTRIBUTER.

1,008,089. Specification of Letters Patent. Patented Nov. 7, 1911.

Application filed May 24, 1911. Serial No. 629,177.

*To all whom it may concern:*

Be it known that I, HENRY SYNCK, citizen of the United States, residing at Maria Stein, in the county of Mercer and State of Ohio, have invented certain new and useful Improvements in Fertilizer-Distributers, of which the following is a specification.

This invention relates to improvements in distributers or spreaders for fertilizing material such as manure, compost, and the like, and has for one of its objects to improve the construction and increase the efficiency and utility of devices of this character.

Another object of the invention is to provide a device of this character whereby the material is distributed over a relatively wide area behind and at one or both sides of the line of travel of the machine.

Another object of the invention is to provide a device of this character in which the distributing mechanism is reversible to enable the material to be distributed laterally at either side of the line of travel of the machine.

Another object of the invention is to provide a device of this character whereby the material may be uniformly distributed rearwardly of the machine and also laterally thereof at one or both sides.

With these and other objects in view the invention consists in certain novel features of construction as hereinafter shown and described and then specifically pointed out in the claims.

Devices of the character to which this invention relates are called fertilizer distributers and are usually arranged to spread material which is carried in bulk in a suitable receptacle, and mounted on wheels.

In the improved device the receptacle is provided with means for feeding and delivering the material into the path of the distributing mechanism whereby a wider spread or layer is accomplished. The invention is presented in different modified forms for the purpose of illustration, and in all of the modifications a shaft with or without a drum and provided with paddles or blades is employed. The shaft, or shaft and its drum, may be arranged in different positions as to height with reference to the receptacle, and may rotate in either direction or higher at one end than at the other, or arranged obliquely to the receptacle either vertically or horizontally, or a combination of both.

The improved apparatus is attached or forms a part of the receptacle and is arranged to be drawn over the ground or object over which the material is to be spread with the shaft, or the shaft and its drum, either arranged at right angles to the direction of motion or obliquely thereto, or the shafts may stand obliquely and the blades be fastened flatwise or at right angles to the shaft or shafts. The blades may also stand partly oblique and partly flatwise on the shaft or drum, as may be preferred.

In the drawings illustrative of the preferred embodiment of the invention: Figure 1 is a top plan view of one form or embodiment of my invention; Fig. 2 is a longitudinal sectional view, the section being taken substantially on the line 2—2 of Fig. 1; Fig. 2$^a$ is a side elevation; Fig. 3 is a top plan view of another form or embodiment of the invention; Fig. 4 is a similar view of another form; Figs. 5, 6 and 7 are corresponding views of other forms; Figs. 8 and 9 are, respectively, end and plan views of another form of the invention; and, Figs. 10, 11 and 12 are corresponding views of still another embodiment.

Corresponding and like parts are referred to in the following description and indicated in all the views of the drawings by the same reference characters.

The improved device embraces in general a receptacle for the material to be distributed, and represented conventionally at 10, mounted upon a suitable running gear and including a rear axle 11, one of the rear wheels being indicated at 12. One of the rear wheels of a mechanism of this character is generally utilized to transmit the requisite motion to the distributing devices and one of the wheels is therefore supplied with a chain wheel 14. A slatted conveyer belt or apron 15 is arranged in the bottom of the receptacle 10, and a pulverizing drum 16 provided with spikes 17 is mounted for rotation at the rear of the receptacle on a shaft 18 and at the rear terminal of the slatted belt or apron. Mounted for rotation above the line of the drum 16 in advance of the same is a shaft 19 carrying teeth or spurs 20. Mounted for rotation upon one side of the receptacle 10 in the rear of the drum 16 is an idler chain wheel 21, and connected to the shaft 18 of the drum 16 is a small chain wheel 22. An endless chain 23 runs over the chain wheel 14 and passes around the idler 21 and also engages the chain wheel 22. By this means it will be obvious that the motion of the chain wheel 14 is transmitted to the drum 16 in the direction of the arrow shown in Fig. 2, although it is to be understood that the drum may be rotated in either direction. The shaft 18 is likewise provided at the opposite end from the chain wheel 22 with another chain wheel 24 which actuates an endless chain 25, engaging a chain wheel 26 on the shaft 19, thereby transmitting motion to the picker devices on said shaft.

Connected to the sides of the receptacle 10 are rearwardly extending supporting brackets 27 supporting a shaft 28 which carries the distributing mechanism. The shaft 18 of the drum 16 is provided with another chain wheel 29 from which an endless chain 30 leads over a chain wheel 31 on the shaft 28, so that the motion of the shaft 18 is transmitted to the shaft 28. The shaft 28 may be provided with a relatively large drum 32 to increase its diameter, and connected to said drum are flights or blades 33 arranged in gradually increasing angularity toward one end of the drum, or with the terminal flights or blades at one end arranged practically in parallel relation to the longitudinal plane of the drum and the remaining flights arranged in gradually increasing angularity toward the terminal flight, at the opposite end of the drum, as shown. By this arrangement it will be obvious that the material which is engaged by the longitudinally extending flights or radially disposed blades at one end will be thrown directly to the rear and that the material which comes in contact with the oblique flight at the opposite end of the drum will be thrown laterally of the line of travel of the machine, while the material which comes in contact with the intermediate flight or blades will be uniformly distributed between these two extreme points. By this means the material is uniformly distributed from a point directly in the rear of the machine at one side to a point laterally of the machine at the opposite side thereof.

In Fig. 3 another embodiment of the distributer is shown, this distributer being also in the form of a drum, designated 32ª, arranged horizontally and oblique to the line of draft, the blades being arranged with increased angularity from one end of the drum to the other, substantially in the same manner as in Fig. 1. In the structure illustrated in Fig. 3, just referred to, the shaft of the drum 32ª may be provided with a universal coupling 34 between the drum and the chain wheel 31ª to enable the chain to operate without crimping, as is manifest.

In Fig. 4, another modification is shown, consisting in arranging the blades 33ᵇ right and left handed from the middle of the drum 32ᵇ toward the ends thereof, with the bearing faces of the blades increasing in angularity in opposite directions or toward the ends of the drum. By this means the material is uniformly distributed in both directions laterally of the line of travel of the machine and likewise in the rear thereof, as will be obvious.

In Fig. 5, the drum is shown as formed in two parts 35 and 36 with a central bearing 37 for the shaft and with a universal joint 38 between the two-part drum and another universal joint 39 between the chain wheel 31 and the drum section 35. In this arrangement also the blades are disposed with their bearing faces increasing in angularity toward the ends to provide for the uniform distribution of the material, as before described.

In Figs. 6 and 7, the member corresponding to the drum 32 is shown in rectangular form transversely of the blades connected to its side faces and increasing in angularity from end to end, the body portions being designated by the reference character 40 and the blades proper by the reference character 41. It will thus be obvious that an efficient economical arrangement of the parts and the requisite uniformity of distribution to be obtained and without materially increasing the expense of construction or the power required to operate the machine.

The blades employed in the various forms illustrated in the accompanying drawings may be constructed of any suitable material such as a single piece of wood, or may be made up of a group of parts such as placing a series of pins, round, square or rectangular, or slats, together, the purpose being to build a face or surface representing a blade that will accomplish the same purpose as a single blade, but will preferably be built of sheet steel bent in the required shape and secured in a suitable manner to the drums.

By referring now to Figs. 8 to 11, inclusive, it will be understood that the same distributing effect may be secured by gradually increasing the blades in size, that is, either in width or length. In that embodiment of the invention illustrated by Figs. 8 and 9, the drum is designated 32ᶜ and the blades which gradually increase in length are designated 33ᶜ, while in Figs. 10 and 11 the blades that are secured to the drum, there designated 32ᵈ, are increased gradually in width, from one end of the drum to the other, as indicated at 33ᵈ.

The drum itself is an important feature of the improved apparatus for certain kinds of work, as the blades are thereby located at a relatively great distance from the shaft, so that the centrifugal forces of the distributing bar of the blades is correspondingly increased, but it is to be understood that my invention is not limited to the use of a drum. In some instances it may be desirable to dispense with the drum and secure the blades directly to the shaft, as illustrated at 33ᵉ in Fig. 12, this of course making a lighter construction.

Having thus described the invention, what is claimed as new is:

1. In a machine for distributing fertilizer, the combination with the discharging mechanism, of a spreader comprising a shaft having blades arranged with the angularity of their bearing faces increasing toward one end.

2. In a machine for distributing fertilizer, the combination with the discharging mechanism, of a spreader comprising a shaft mounted for rotation and reversible end for end, and blades rotative with said shaft and arranged with the angularity of their bearing faces increasing toward one end of the shaft.

3. In a machine for distributing fertilizer, the combination with the discharging mechanism, of a spreader comprising a drum mounted for rotation and having blades connected thereto and arranged right and left handed at each side of the center thereof, and with the angularity of their bearing faces increasing toward the ends of the drum.

4. In a machine for distributing fertilizer, the combination with the discharging mechanism, of a spreader comprising a shaft mounted for rotation and having blades rotative therewith and right and left handed at each side of the center thereof, and with the angularity of their bearing faces increasing toward the ends of the drum.

In testimony whereof, I affix my signature in presence of two witnesses.

HENRY SYNCK. [L. S.]

Witnesses:
V. F. LOCHTEFELD,
MATILDA LOCHTEFELD.